United States Patent
Hooi

(10) Patent No.: US 11,279,475 B2
(45) Date of Patent: Mar. 22, 2022

(54) ALTITUDE ESTIMATION USING DIFFERENTIAL PRESSURE SENSORS IN GROUND EFFECT

(71) Applicant: Kitty Hawk Corporation, Palo Alto, CA (US)

(72) Inventor: Chin Gian Hooi, Sunnyvale, CA (US)

(73) Assignee: Kitty Hawk Corporation, Palo Alto, CA (US)

( * ) Notice: Subject to any disclaimer, the term of this patent is extended or adjusted under 35 U.S.C. 154(b) by 259 days.

(21) Appl. No.: 16/698,657

(22) Filed: Nov. 27, 2019

(65) Prior Publication Data

US 2021/0009261 A1    Jan. 14, 2021

Related U.S. Application Data

(63) Continuation of application No. 16/507,859, filed on Jul. 10, 2019, now Pat. No. 10,526,080.

(51) Int. Cl.
| | |
|---|---|
| *B64C 27/08* | (2006.01) |
| *G05D 1/10* | (2006.01) |
| *G06N 7/00* | (2006.01) |
| *B64C 27/20* | (2006.01) |

(52) U.S. Cl.
CPC ............. *B64C 27/08* (2013.01); *G05D 1/102* (2013.01); *G06N 7/005* (2013.01); *B64C 27/20* (2013.01)

(58) Field of Classification Search
CPC ..... B64C 27/08; B64C 27/20; B64C 29/0025; G05D 1/102; G06N 7/005; B64D 43/00
See application file for complete search history.

(56) References Cited

U.S. PATENT DOCUMENTS

| | | | |
|---|---|---|---|
| 10,526,080 B1 * | 1/2020 | Hooi | B64C 29/0025 |
| 2018/0339768 A1 | 11/2018 | Wang | |
| 2019/0061924 A1 | 2/2019 | Kita | |
| 2019/0127056 A1 | 5/2019 | Weekes | |

FOREIGN PATENT DOCUMENTS

| | | | | |
|---|---|---|---|---|
| CA | 3046741 A1 * | 12/2019 | | G01P 13/025 |

OTHER PUBLICATIONS

Chin Gian Hooi, Height Estimation and Control of a Rotorcraft in Ground Effect Using Multiple Pressure Probes, 2015.
Hooi et al., Height Estimation and Control of Rotorcraft in Ground Effect Using Spatially Distributed Pressure Sensing, Journal of the American Helicopter Society, Sep. 2, 2016.

* cited by examiner

*Primary Examiner* — Abby Y Lin
*Assistant Examiner* — Renee LaRose
(74) *Attorney, Agent, or Firm* — Van Pelt, Yi & James LLP

(57) ABSTRACT

A plurality of sensor datasets is received including: (1) an interference sensor dataset which is associated with interference between airflow from a first rotor in a multicopter and airflow from a second rotor in the multicopter, (2) a first and a second isolated sensor dataset which are associated with isolated airflows from the first rotor and the second rotor, respectively. A generalized flow model associated with a generalized rotor is received and an altitude for the multicopter is generated based at least in part on the plurality of sensor datasets and the generalized flow model, including by using a non-linear filter that builds a consolidated probability function associated with altitude that reconciles the plurality of sensor datasets with the generalized flow model.

21 Claims, 10 Drawing Sheets

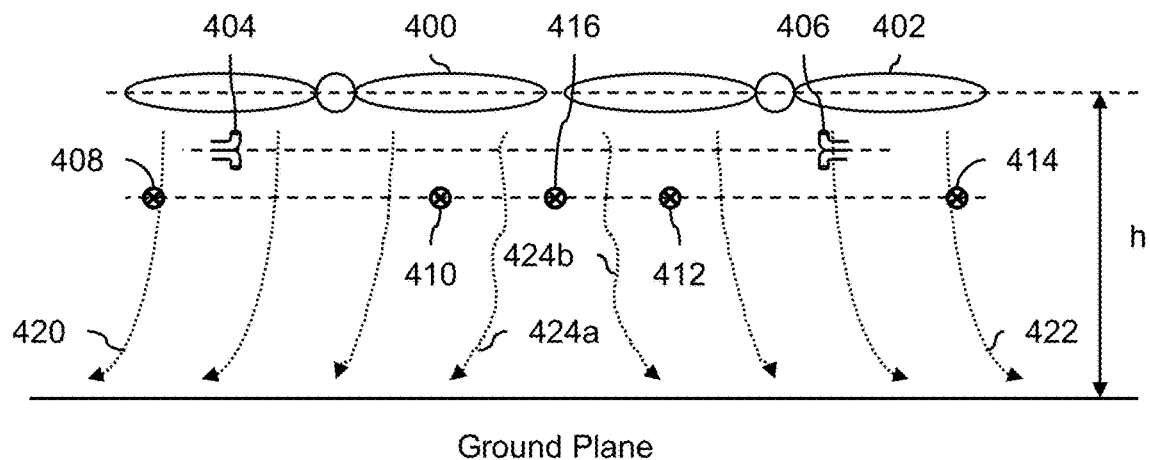
FIG. 4
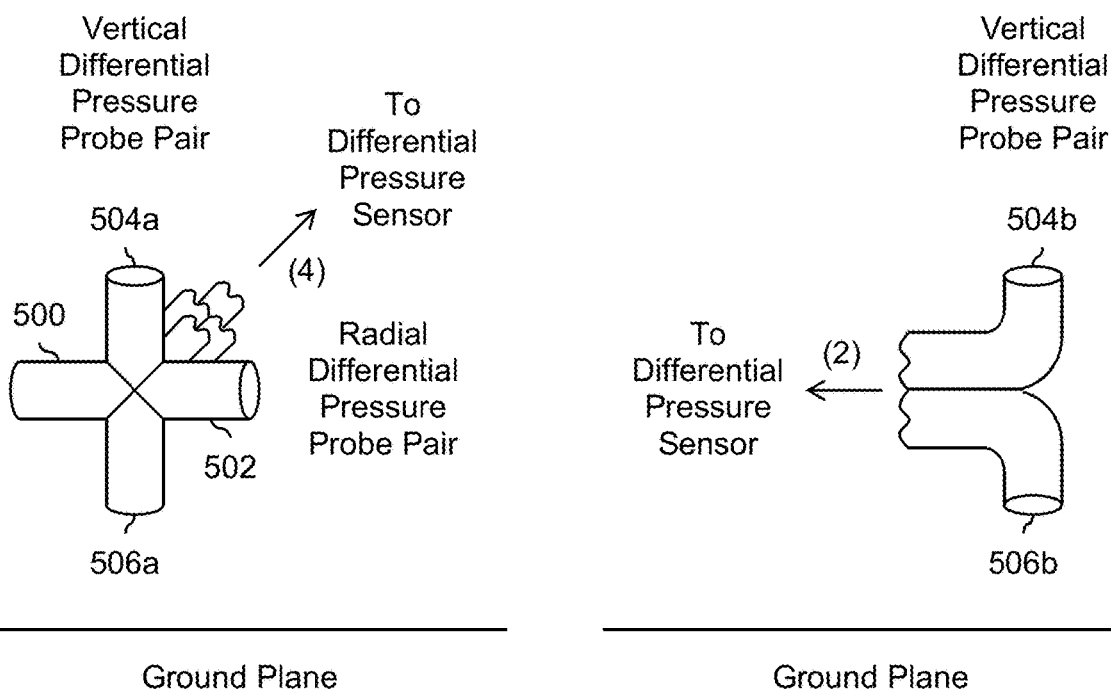
FIG. 5A  FIG. 5B

ALTITUDE ESTIMATION USING DIFFERENTIAL PRESSURE SENSORS IN GROUND EFFECT

CROSS REFERENCE TO OTHER APPLICATIONS

This application is a continuation of co-pending U.S. patent application Ser. No. 16/507,859 entitled ALTITUDE ESTIMATION USING DIFFERENTIAL PRESSURE SENSORS IN GROUND EFFECT filed Jul. 10, 2019 which is incorporated herein by reference for all purposes.

BACKGROUND OF THE INVENTION

Accurate estimation of an aircraft's position in the air (e.g., altitude, attitude, etc.) is very important. Some current altitude estimation techniques rely upon vision or wave-based propagation techniques, such as radar and Lidar. However, vision and wave-based altitude estimation techniques are undesirable in some applications for a variety of reasons. For example, vision and wave-based altitude estimation techniques do not sense the presence of ground effect and so would not work well for vertical takeoff and landing (VTOL) multicopters (which generate large amounts of downward airflow) when such aircraft are operating near the ground. The downward airflow acts as a cushion between the vehicle and the ground and contributes to abnormal vehicle dynamics, hence methods that accurately sense the interaction between a multicopter and the ground are crucial for successful VTOL. Another drawback to wave-based altitude estimation techniques is that wave-based systems tend to be heavy and/or expensive. New altitude estimation techniques which work in the presence of ground effect and/or which are relatively light and/or inexpensive would be desirable (e.g., for use in lightweight and/or VTOL multicopters).

BRIEF DESCRIPTION OF THE DRAWINGS

Various embodiments of the invention are disclosed in the following detailed description and the accompanying drawings.

FIG. 3 is a diagram illustrating a top view of a multicopter with the rotors on.

FIG. 4 is a diagram illustrating an embodiment of ground effect airflow with induced velocity sensor datasets used as inputs to the flow model.

FIG. 5A is a diagram illustrating a first side view of an embodiment of a sensor that includes differential pressure probes.

FIG. 5B is a diagram illustrating a second side view of an embodiment of a sensor that includes differential pressure probes.

DETAILED DESCRIPTION

Figure 1A:
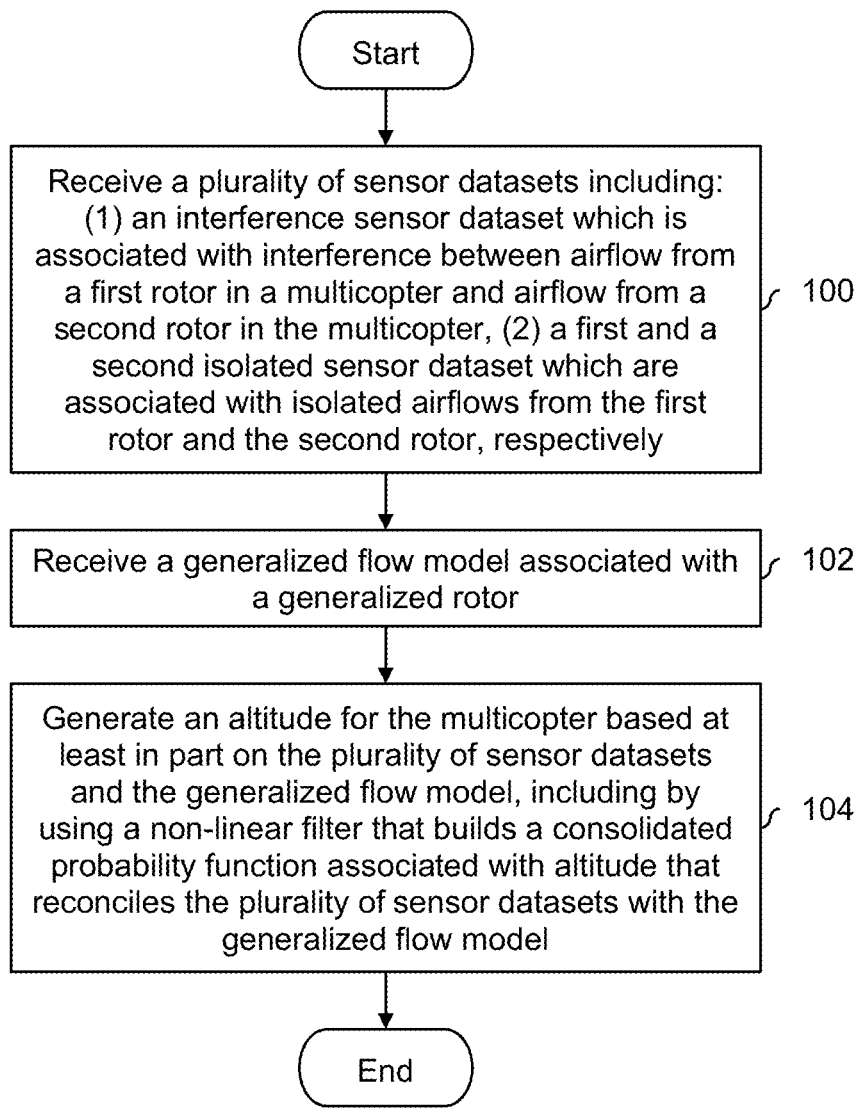
FIG. 1A is a flowchart illustrating an embodiment of a process to generate an altitude for a multicopter.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of techniques to measure, estimate, or otherwise generate an altitude associated with a multicopter are described herein. As used herein, the term multicopter refers to an aircraft with multiple rotors that rotate about a vertical axis of rotation. This configuration of rotors (e.g., which generates airflow downwards) permits a multicopter to perform vertical takeoff and landings (VTOL).

In some applications, the multicopter is an ultralight (e.g., weighing on the order of 250 pounds) and is flown autonomously. One problem with autonomous ultralight multicopters is that it is important to get an accurate estimate or measurement of the altitude. For example, during an autonomous vertical landing (e.g., where there is no pilot to visually gauge the distance to the ground and adjust the multicopter's vertical descent accordingly), an inaccurate altitude estimate or measurement could lead to an uncomfortable or even dangerous landing if the autonomous flight controller thinks the multicopter is higher off the ground than it is. With a pilot, a less accurate altitude estimator may be sufficient because the pilot will observe the vehicle's altitude and respond accordingly (e.g., slow the vehicle's descent just prior to touching down during a vertical landing). As will be described in more detail below, the various estimation techniques described herein produce sufficiently accurate results and are suitable for implementation in a processing and/or storage resource-limited environment and/or an ultralight application (e.g., since an ultralight will typically have moderate processing and storage resources available for altitude estimation, given the severe weight restrictions of an ultralight).

The nature of the multicopter lies in its multiple rotors, which contribute to a large effective rotor diameter, that is, the maximum tip-to-tip distance between the most outboard rotors (e.g., the maximum distance between the left front outboard rotor tip and right front outboard rotor tip in the example 10-rotor multicopter described below). Since ground effect is present when operating at a height equivalent to the effective rotor diameter, the multicopter could be operating in ground effect during a large portion of a flight, hence making accurate sensing and estimation of ground effect even more important.

FIG. 1A is a flowchart illustrating an embodiment of a process to generate an altitude for a multicopter. In various embodiments, the exemplary process described here is performed by a variety of components, modules, and/or devices on a multicopter, such as a computer program product (e.g., embodied in a non-transitory computer readable storage medium and comprising computer instructions), a processor and a memory (e.g., where the memory is coupled with the processor and is configured to provide the processor with instructions which are executed by the processor), and/or a semiconductor device (e.g., a field-programmable gate array (FPGA) or an application-specific integrated circuit (ASIC)).

At 100, a plurality of sensor datasets including: (1) an interference sensor dataset which is associated with interference between airflow from a first rotor in a multicopter and airflow from a second rotor in the multicopter, (2) a first and a second isolated sensor dataset which are associated with isolated airflows from the first rotor and the second rotor, respectively, is received. As the name implies, a sensor dataset is a set of data that is received from a sensor.

At step 100, two types of sensor datasets are received: an interference sensor dataset and an isolated sensor dataset. Interference sensor datasets are (generally speaking) sets of data associated with (e.g., are measurements of or from) interfering (e.g., combined, mixed, etc.) airflows from two different rotors. For example, in one exemplary multicopter described below, there are 10 rotors which are tightly packed, sometimes so much so that two adjacent rotors overlap with each other in a vertical direction but at different heights. In one example, a sensor is placed beneath such a rotor overlap and the data from that sensor comprises an interference sensor dataset.

Conceptually, the interference sensor dataset provides insight into the influence that one rotor imparts on other rotors, which is important for a multicopter especially in the presence of ground effect. For the case of a single rotor close to a ground plane, the increase of thrust and other deviations from nominal flow conditions are caused by interaction between the single rotor and ground. Due to the complex flow interaction between multiple rotors in a multicopter, deviations from nominal flow conditions can also be caused by ground effect and the influence from other rotors (e.g., one rotor is spinning faster than a second rotor and the vehicle is tilted at an angle, i.e., not horizontal).

Using the interference sensor dataset, a processor can separate the influence of multi-rotor interference from ground effect. One such use case is the condition where the interference sensor dataset shows extremely noisy data, which correlates with the amount of interference being roughly equivalent between rotors, as opposed to the interference sensor dataset showing airflow being dominant from one side, which corresponds to one rotor spinning much faster than the other rotors and hence its airflow being dominant even in the presence of a ground plane (i.e., ground effect). Without such a dataset, the estimator would be incorrectly inferring that deviations from nominal airflow conditions are all due to ground effect and ignore rotor flow differences.

The second type of sensor dataset received at step 100 is an isolated sensor dataset. As the name implies, such datasets are associated with (e.g., are measurements of or from) isolated airflow (e.g., with little or no interfering airflow from another rotor). In one example, a sensor is placed beneath a given rotor far away from other rotors and/or other potential sources of interference (e.g., away from large parts of the multicopter, such as a fuselage, a float, etc. which can interfere with the airflow produced by the rotor).

At 102, a generalized flow model associated with a generalized rotor is received. Generally speaking, a flow model is a model of the velocity variation across the airflow produced by a rotor when the rotor is at various altitudes (e.g., heights from the ground) and the rotor is spinning at various speeds. In some embodiments, the generalized flow model uses (e.g., as an input of the flow model) the same types of information as the isolated sensor datasets received at step 100.

For example, if the isolated sensor datasets received at step 100 (e.g., airflow) measure velocity in an isolated region at appropriate locations below a first and second rotor, then the generalized flow model may have those velocities as outputs and an induced (e.g., airflow) velocity (e.g., above and/or entering the rotor in a downward direction) as the input to the model from the isolated sensor datasets. Another version of this example has a similar setup with the rotational speed of the rotor being used as the input to the model, where the rotational speed of the rotor is mapped and/or correlated to the induced velocity of the rotor. This setup has the advantage of requiring fewer sensors since rotational speed of the rotor is typically already part of the multicopter rotor speed control setup.

A generalized flow model is generalized in the sense that it is independent of and/or agnostic to a specific rotor at a specific location or position in the multicopter. For example, in the actual multicopter, the rotors will produce different airflow depending upon their location relative to the ground and/or nearby sources of interference (e.g., parts of the multicopter that interfere with the airflow, other airflow from other rotors that interfere with the observed airflow, etc.). For example, an outboard rotor that is at the distal end of a boom and located next to three adjacent (and interfering) rotors will produce a different airflow compared to an inboard rotor that is located over a float and is adjacent to the fuselage. Similarly, even an inboard middle rotor may have a different airflow than an inboard front rotor or inboard back rotor due to different numbers, types, and/or positions of sources of interference. However, instead of obtaining multiple flow models for each rotor position or location, a (e.g., single) generalized flow model is used which is representative of a generalized rotor. For example, the (conceptual) generalized rotor may have no nearby sources of interference and therefore produces a clean, isolated, and/or ideal airflow. This may be attractive in a resource-limited aircraft because only a single flow model needs to be stored, ingested, and processed (e.g., instead of storing and using multiple flow models, each specific to a different rotor location or position).

At 104, an altitude (e.g., estimation) for the multicopter is generated based at least in part on the plurality of sensor datasets (e.g., received at step 100) and the generalized flow model (e.g., received at step 102), including by using a non-linear filter that builds a consolidated probability function associated with altitude that reconciles the plurality of sensor datasets with the generalized flow model. The consolidated probability function term is so named because sensor data associated with various (combinations of) rotors (e.g., just the first rotor, just the second rotor, a combination of the first rotor and the second rotor, etc.) and various (combinations of) sensor datasets associated with each rotor (e.g., just one sensor dataset from middle "inboard" rotors with more interference, multiple sensor datasets at various locations relative to the front "outboard" rotor with less interference, etc.) is consolidated or otherwise combined into a single probability function. In some embodiments where altitude estimation is the only goal, the consolidated probability function is a two-dimensional probability density function where the x-axis is the various possible altitudes (i.e., heights) of the multicopter and the y-axis is the corresponding probability for those various altitudes.

In building the consolidated probability function, the non-linear filter reconciles the plurality of sensor datasets with the generalized flow model. As described above, the generalized flow model is generalized and is not specific to one particular rotor at a particular location or position in the multicopter (e.g., the generalized flow model reflects a clean, isolated, and/or ideal airflow). However, the various sensor datasets may display certain airflow characteristics that are reflective of nearby sources of interference (e.g., adjacent rotors, nearby floats or fuselages, etc.). For example, when two rotors are close to each other (possibly overlapping), the airflow will not be a clean "skirt" when close to the ground but will rather have some airflow distortion at or near the airflow interface between the two rotors. The generalized flow model will reflect the interference sources as measured by the sensor datasets, and the non-linear filter further reconciles the two so that the interference sources do not cause an incorrect interpretation during the altitude estimation (e.g., it is not interpreted as the ground reflecting the airflow back).

The filter used at step 104 is a non-linear filter because linear filters have been found to be insufficient given the complexity of the altitude estimation problem, the complicated nature of the airflow generated by multiple rotors, and the non-linear dynamics of the vehicle operating in ground effect for some types of multicopters. The altitude estimation, generalized flow model, sensor datasets, and vehicle dynamics are too complex for a linear filter to model.

In some embodiments, the non-linear filter is a non-linear Bayesian filter. Non-linear Bayesian filters may be attractive because Bayesian techniques are suited to work with noisy measurements, which is the case here. Some specific non-linear Bayesian filter examples include a grid-based recursive Bayesian filter (e.g., which is attractive because it can be easily implemented). Other non-linear Bayesian filter examples include an unscented Kalman filter or a particle filter. An advantage to using a grid-based recursive Bayesian filter is its ability to handle non-Gaussian measurements and dynamics (e.g., for multicopter airflow, and dealing with the interference from multiple rotors and the airframe) whereas Gaussian properties are a requirement for some non-linear filters (e.g., unscented Kalman filter). The grid-based approach to Bayesian filters also allows us to easily dictate the resolution of our estimate by varying the grid size (where each grid represents a step in the estimated quantity (e.g., altitude) as opposed to the complex manipulation of particles in a particle filter) and as such can be easily implemented with limited or constrained processing resources.

In some embodiments, the process of FIG. 1A is specifically tailored for operations in ground effect (e.g., when the multicopter is sufficiently close to the ground or water that the airflow is affected by (e.g., bends) due to the ground plane or water plane). As such, in some embodiments, the process of FIG. 1A is only performed during a vertical takeoff or a vertical landing and/or operations close to the ground. For example, the process of FIG. 1A may be initiated when a vertical takeoff is imminent or begins and ends (e.g., at least temporarily) when the multicopter has reached a sufficiently high altitude that it is out of ground effect and transitions to a forward flight mode (e.g., where it flies at a constant altitude within a 2D plane). Another embodiment of the process in FIG. 1A may be running during the entire flight operation where the multicopter is always operating sufficiently close to the ground or water so as to always be in ground effect. As such, the process in FIG. 1A is critical to estimating and maintaining the altitude of the vehicle since any small perturbation in the vehicle's altitude needs to be closely tracked and corrected for when close to the ground or water.

Figure 1B:
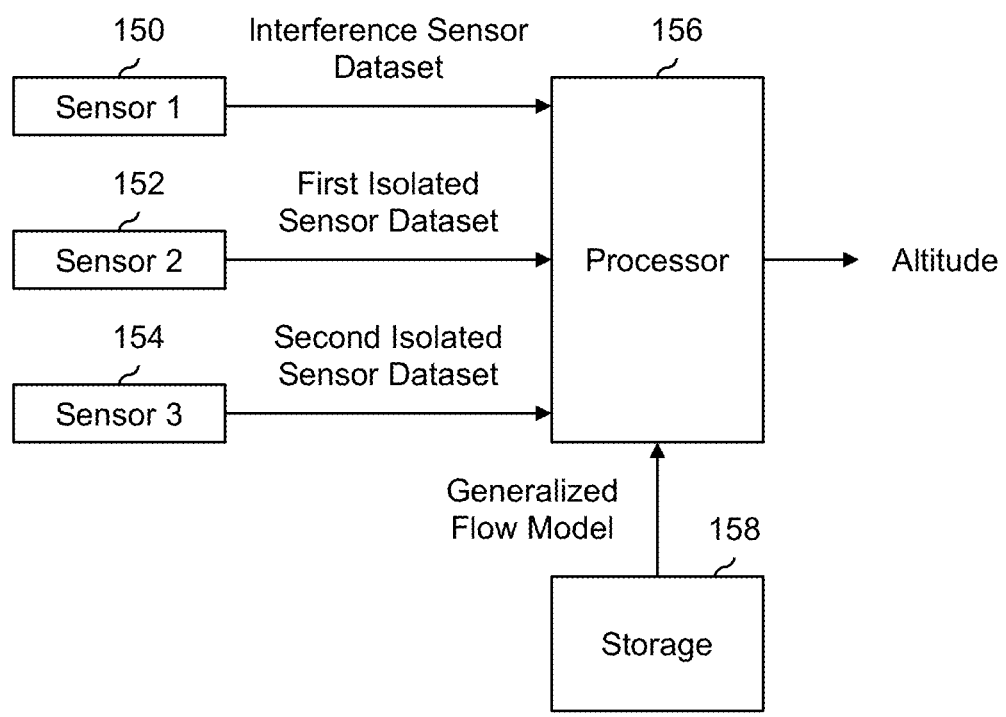
FIG. 1B is a diagram illustrating an embodiment of a system which generates an altitude for a multicopter.

FIG. 1B is a diagram illustrating an embodiment of a system which generates an altitude for a multicopter. In this diagram, an example system which performs the process of FIG. 1A is described. In this example, there are three sensors (150, 152, and 154) which output the interference sensor dataset, the first isolated sensor dataset, and the second isolated sensor dataset, respectively. The datasets are passed to the processor (156), along with a generalized flow model from storage (158). In various embodiments, the storage (memory) may be long-term or short-term memory, volatile or non-volatile, etc. The processor (156) uses these inputs to generate an altitude for the multicopter. For example, the altitude may be used by the flight controller or flight computer to adjust and/or control the rotors of the multicopter.

It may be helpful to describe an exemplary multicopter so that the process of FIG. 1A can be better understood. The following figure describes a multicopter that is ultralight and designed to fly overwater.

Figure 2:
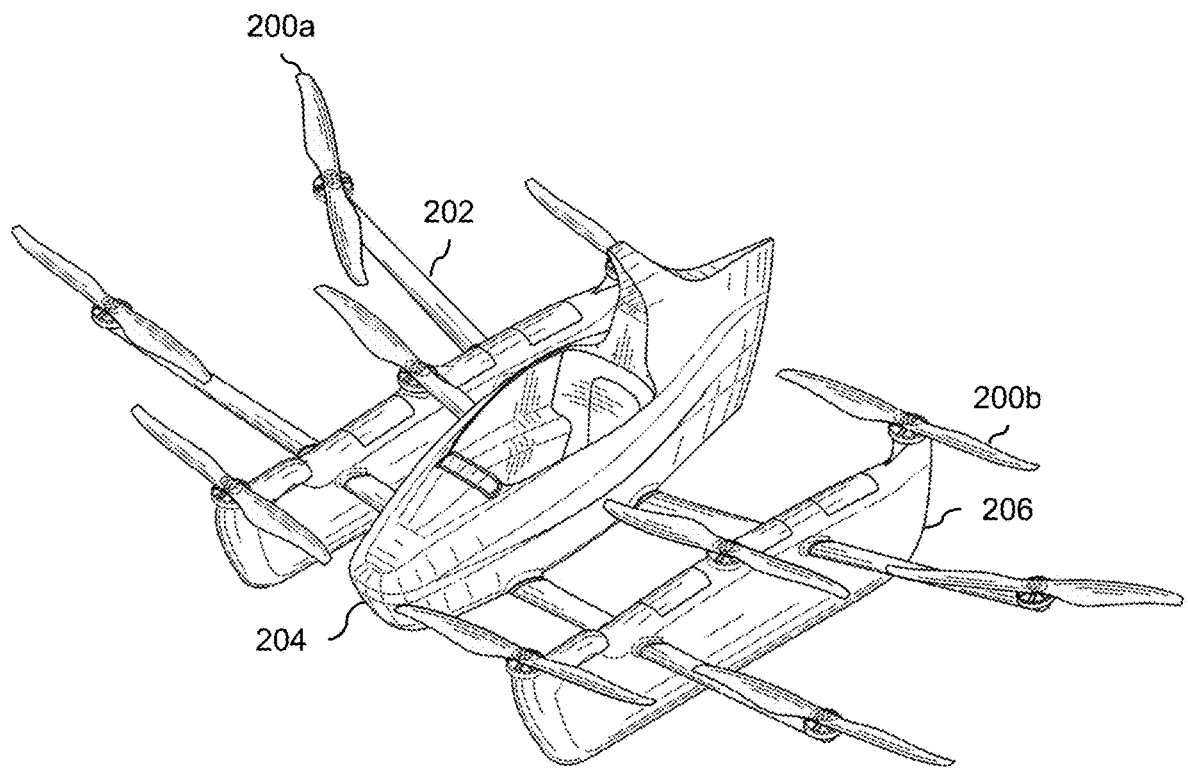
FIG. 2 is a diagram illustrating an embodiment of an ultralight and overwater multicopter.

FIG. 2 is a diagram illustrating an embodiment of an ultralight and overwater multicopter. In some embodiments, the multicopter is autonomous. In this example, the multicopter has 10 rotors (200a and 200b). All of the rotors in this example have the same size and/or dimensions (e.g., same radius, same blade angle, same twisting, etc.). Using identical rotors (as shown here) may be helpful because this better supports the use of a (e.g., single) generalized flow model (see, e.g., steps 102 and 104 in FIG. 1).

Five of the rotors are located on the port (i.e., left) side of the multicopter and the remaining five rotors are located on the starboard (i.e., right) side of the multicopter. The four outboard rotors (200a) are positioned on the distal ends of booms (202) which extend outward from the fuselage (204) and pass through the floats (206). The multicopter is able to take off and land on water (if desired) and the floats provide buoyancy for the multicopter to float on water. The six inboard rotors (200b) are positioned on the top of the float.

In this example, the multicopter is designed to fit into a trailer and therefore the rotors are tightly packed together so that the footprint of the multicopter is sufficiently small enough to fit into a trailer. The following figure shows a top view of the multicopter with the rotors on.

Figure 3:
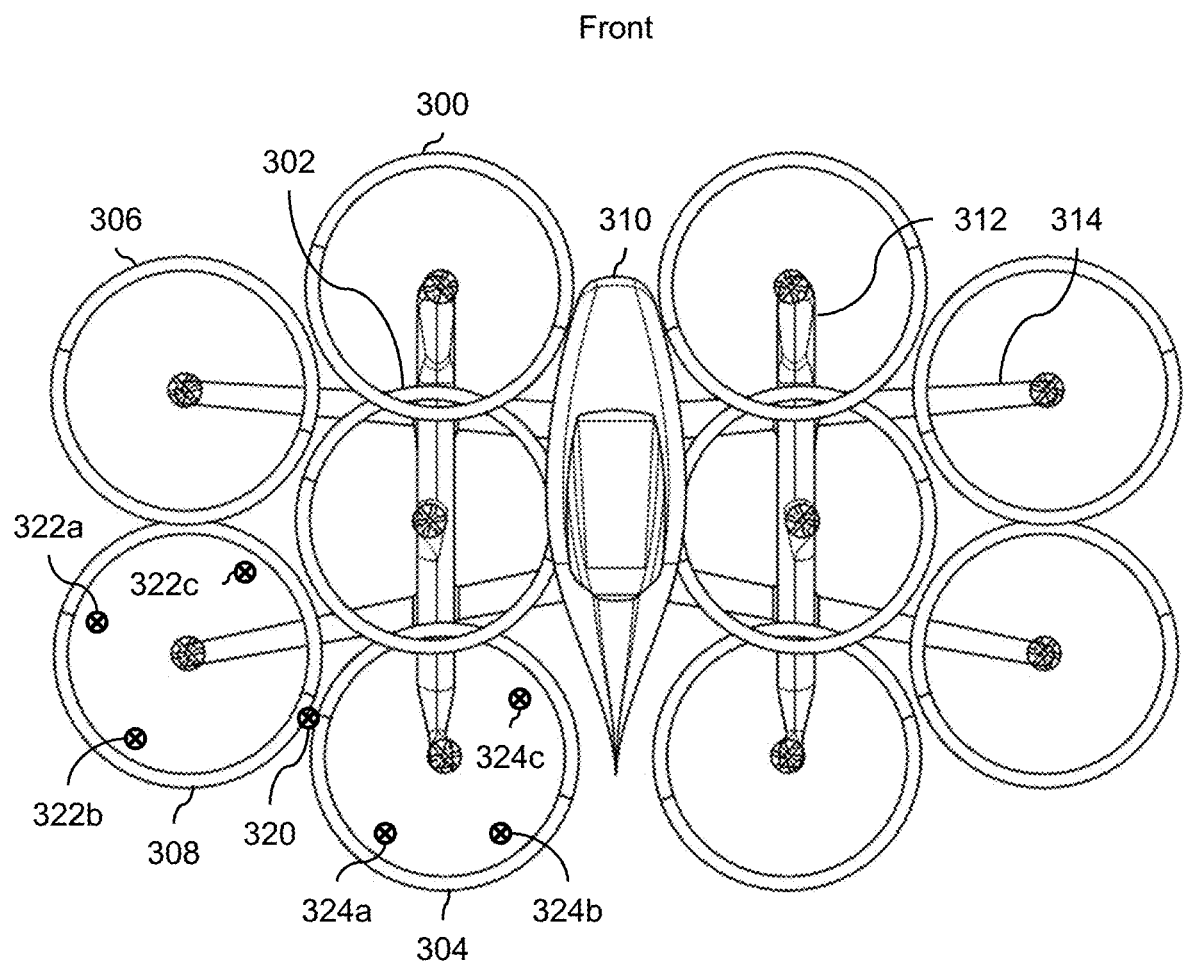

FIG. 3 is a diagram illustrating a top view of a multicopter with the rotors on. FIG. 3 continues the example of FIG. 2. To better show the tight packing of the rotors, the rotors in this figure are shown rotating. As shown here, there is overlap between the front inboard rotors (300) and the middle inboard rotors (302), between the middle inboard rotors (302) and the back inboard rotors (304), and between the front outboard rotors (306) and the back outboard rotors (308). Other parts of the multicopter also interfere with the airflow produced by the rotors, such as the side of the fuselage (310) and the floats (312), both of which may affect the airflow produced by the inboard rotors (300, 302, and 304). Similarly, the booms (314) affect all rotor airflow.

In this example, sensor 320 is positioned to collect an interference sensor dataset (e.g., received at step 100 in FIG. 1). Note, for example, that the sensor is located beneath the edge of the (left) back outboard rotor (308) and the (left) back inboard rotor (304) where the airflow from those two rotors will interfere with each other. In contrast, sensors 322a, 322b, 322c, 324a, 324b, and 324c are positioned to collect isolated sensor datasets. For example, those sensors are located as far away as possible from sources of interference, such as other rotors or parts of the multicopter which may interfere with rotor airflow (e.g., away from the booms, floats, and/or fuselage). In various embodiments, the sensors may be held or otherwise positioned at some desired position or location via a boom, rod, or other structure that is connected to various parts of the multicopter (e.g., the fuselage, a float, a (rotor) boom, etc.).

Returning briefly to FIG. 1, in some embodiments, the specific geometry of the example multicopter shown here and in FIG. 2 (e.g., the way the floats affect airflow(s), the tight packing of the rotors, etc.) is incorporated into the process described in FIG. 1. For example, at step 100 in FIG. 1, the isolated sensor datasets are collected for the outboard rotors as opposed to the inboard rotors. In some embodiments, up to two datasets are collected per rotor for all the outboard rotors (e.g., 300, 304, 306, and 308 for the port side in FIG. 3), and only one dataset is collected for the inboard rotor (e.g., 302 in FIG. 3). These datasets are located as shown in FIG. 3 by being as far away as possible from the airframe, booms, floats, and other rotors. The same dataset configuration is repeated between the port and starboard sides due to centerline symmetry (i.e., two datasets per outboard rotor and one per inboard rotor). Using this sensor configuration, more weight is put on the outboard rotors which have less interference sources and can potentially capture attitude information, and conversely, less weight is placed on the inboard rotors which tend to have more interference sources.

The following figure shows an example of ground effect airflow (e.g., 420 in FIG. 4) that may be sampled by sensors 320, 322a, 322b, 322c, 324a, 324b, and 324c.

FIG. 4 is a diagram illustrating an embodiment of ground effect airflow with induced velocity sensor datasets used as inputs to the flow model. In the example shown, the rotor on the left (400) corresponds to rotor 308 from FIG. 3 and the rotor on the right (402) corresponds to rotor 304 from FIG. 3. Similarly, sensors 404, 406, 416, 408, 410, 412 and 414 in this example correspond to sensors 322c, 324c, 320, 322a, 322b, 324a, and 3224b from FIG. 3, respectively. As described above, the data from sensors 404, 406, 408, 410, 412, 414, and 416 are used to measure the airflow velocity for each rotor of the multicopter (100), which are used as sensor datasets in the estimation (104) of altitude (i.e., h).

Sensors 408, 410, 412 and 414 are located within the isolated airflow (420 and 422) from the rotor on the left (400) and the rotor on the right (402), respectively. In contrast, sensor 416 is located within the turbulent airflow (424a and 424b) where the airflow from the rotor on the left interferes with the airflow from the rotor on the right and vice-versa. Sensors 404 and 406 are located perpendicularly close to the rotor plane to measure the induced airflow velocity, which is the velocity of the incoming airflow right below the rotor plane, which are then input into the generalized flow model (102).

The airflow in the turbulent and/or interference regions (424a and 424b) are flowing in the opposite direction as they normally would (e.g., radially towards the center of the rotor or chaotically spiraling as opposed to radially away from the center of the rotor). As will be described in more detail below, a generalized flow model will reflect the expected and/or ideal direction of airflow (e.g., radially outward) and these discrepancies in directions are handled by the non-linear filter.

In some embodiments, induced velocity sensors 404 and 406 are placed at a normalized vertical distance (e.g., below the rotor's plane of rotation) within a range of 0.01-0.1 R (where R is the radius of the rotor) and/or at a normalized radial distance (e.g., from the rotor's axis of rotation) within a range of 0.6-0.95 R. In some applications, it is desirable to place the sensor at positions within such ranges because these ranges capture the induced airflow velocities as vertically close as possible to the rotor plane and also at the radial location of maximum lift along the blade. In some embodiments, these ranges are optimized for the rotor airfoil and/or local lift distribution.

In some embodiments, sensors 408, 410, 412, and 414 are placed at a normalized vertical distance within a range of 0.1-0.4 R and/or at a normalized radial distance within a range of 0.25-0.9 R. In some applications, it is desirable to place the sensor at positions within such ranges because these ranges capture the airflow velocities as the airflow is still forming and/or is fully formed but their structures have not broken down yet or been interfered with significantly by the airflow from other rotors.

In some embodiments, sensor 416 is placed at a normalized vertical distance within a range of 0.1-0.4 R and/or at a normalized radial distance (e.g., from either rotor's tip) within a range of +/−0-0.2 R (where 0 R is located at the middle point between either rotor's tip). In some applications, it is desirable to place the sensor at positions within such ranges because these ranges capture the interference airflow velocities between multiple rotors at approximately equal distances.

In one embodiment of the setup as shown in FIG. 4, the induced velocity sensors (404 and 406) are replaced with rotor rotational speed sensors. Instead of the induced velocity sensors which directly measure the induced velocity at the rotor plane, the rotational speed sensors measure rotor rotational speed which can be mapped to the induced velocity of the rotors.

In some embodiments, a sensor used to obtain the interference sensor dataset and/or the isolated sensor dataset (e.g., at step 100 in FIG. 1) includes differential pressure probes. The following figures show one such example.

FIG. 5A is a diagram illustrating a first side view of an embodiment of a sensor that includes differential pressure probes. In the example shown, there are two pairs of differential pressure probes: a pair of radial differential pressure probes (500 and 502) and a pair of vertical differential pressure probes (504a and 506a). Each probe (500, 502, 504a, and 506a) consists of a pipe or tube with a 90° bend where the other section of the tube, which physically connects to the pressure sensor, goes into the page (not shown here).

The radial differential pressure probe pair (500 and 502) is oriented or otherwise positioned with the openings oriented or pointing parallel to the rotor plane. Furthermore, one of the radial probe ends (e.g., 500) needs to point radially inward and the other probe end (e.g., 502) needs to point radially outward. The vertical differential pressure probe pair (504a and 506a) is oriented with the openings oriented or pointing perpendicular to the rotor plane. The four probes in FIG. 5A are connected to two differential pressure sensors, where 500 and 502 connect to one sensor and measure radial pressure, and 504a and 506a connect to another sensor and measure vertical pressure. These flow pressures are then converted into (e.g., calibrated) vertical and radial velocities (e.g., using wind tunnel calibration).

FIG. 5B is a diagram illustrating a second side view of an embodiment of a sensor that includes differential pressure probes. For clarity, the radial differential pressure probe pair (500 and 502 in FIG. 5A) is not shown to better show the vertical differential pressure probes (504b and 506b). The view shown here is another side view with the probes rotated 90° from the view shown in FIG. 5A. From this view, the 90° bend of the differential pressure probes is more readily visible. These vertical probes are connected to differential pressure sensors to output vertical (e.g., airflow) pressure, which is then calibrated into vertical velocities.

In some embodiments, the induced velocity of each rotor needs to be measured, e.g., in FIG. 4. For the measurement of induced velocity, a vertical differential pressure probe pair is needed per rotor (see, e.g., 404 and 406 in FIG. 4). FIG. 5B is the close-up view of the 404 and 406, where the vertical probes are oriented or pointed perpendicular to the rotor plane and no radial probes are needed.

A benefit to using differential pressure probes is that they are very lightweight compared to some other types of sensors. For example, it is possible to measure altitude using lidar or radar but conventional lidar, radar, and vision-based techniques are comparatively heavy and relatively large. In contrast, differential pressure probes have dimensions on the order of a few inches (e.g., ~3 inches) and a weight on the order of 50 g.

Another benefit of using differential pressure probes is their robustness to debris and an adverse operational environment (i.e., they work well in dusty environments or on ground surfaces with varying reflectivity). In contrast, lidar, radar, and vision-based techniques have varying degrees of difficulty working robustly in these environments.

More importantly, differential pressure probes work well in the presence of ground effect (e.g., the rotor airflow generated earlier is deflected by the ground plane and interacts with current rotor airflow, as shown in FIG. 4). In contrast, other types of altitude measurement techniques that rely upon other types of sensors (e.g., lidar, vision, or radar-based techniques) do not account for ground effect in their measurement process and hence do not produce good altitude measurements in the presence of ground effect. These techniques do not account for ground effect explicitly, i.e., as the vehicle thrust is affected by the presence of a ground plane (ground effect), its height changes and these techniques implicitly detect this height change. Conversely, differential pressure probes detect the change in thrust due to ground effect and are hence explicitly sensing the changes, which allows for quicker estimation of height and control of the vehicle.

Yet another benefit of using differential pressure probes is their measurement of the source or cause of altitude changes due to ground effect, since a pressure change, and by association a velocity or rotor thrust change, is necessary for an aircraft to change altitude. This change in aircraft altitude by being in close proximity to a ground plane (i.e., without any change to motor/rotor speed) is the key effect of ground effect. By using differential pressure probes, it may be possible to anticipate (or at least get some earlier or faster sense of a change in altitude) compared to other distance-measuring techniques, such as lidar, vision, or radar which always measure the after-effect.

In one example the multicopter shown in FIG. 3 may have sensors assigned as follows, where one vertical-and-radial sensor comprises two differential pressure probe pairs (e.g., the vertical pair and the radial pair as shown in FIG. 5A) for differential pressure measurement, and one vertical sensor comprises one differential pressure probe pair (e.g., the vertical pair as shown in FIG. 5B) for induced velocity measurement (as input to generalized flow model 102). For brevity, the following table does not differentiate between the rotors on the left side and the right side and sensor assignment or placement is done symmetrically.

TABLE 1

| | Example Sensor Assignment | |
|---|---|---|
| Rotor | Number of Sensors (2 DPP Pairs, FIG. 5A) Beneath Rotor | Number of Induced Velocity Sensors (1 Vertical DPP Pair, FIG. 5B) Beneath Rotor |
| Front Inboard Rotor (e.g., 300 in FIG. 3) | 2 (away from interference sources) | 1 |
| Middle Inboard Rotor (e.g., 302 in FIG. 3) | 1 (farthest location from airframe) | 1 |

TABLE 1-continued

Example Sensor Assignment

| Rotor | Number of Sensors (2 DPP Pairs, FIG. 5A) Beneath Rotor | Number of Induced Velocity Sensors (1 Vertical DPP Pair, FIG. 5B) Beneath Rotor |
|---|---|---|
| Back Inboard Rotor (e.g., 304 in FIG. 3) | 2 (e.g., 324a and 324b in FIG. 3) | 1 (e.g., 324c in FIG. 3) |
| Front Outboard Rotor (e.g., 306 in FIG. 3) | 2 | 1 |
| Between Back Outboard Rotor (e.g., 308 in FIG. 3) and Back Inboard Rotor (e.g., 304 in FIG. 3) | 1 (e.g., 320 in FIG. 3) | 0 |
| Back Outboard Rotor (e.g., 308 in FIG. 3) | 2 (e.g., 322a and 322b in FIG. 3) | 1 (e.g., 322c in FIG. 3) |

In this example, the middle inboard rotors (e.g., 302 in FIG. 3) are completely surrounded by other rotors, as well as the sidewall of the fuselage. As a result, the airflow produced by the middle inboard rotors is more turbulent and has more interference compared to the airflow produced by the other rotors. As such, in this example, there is only one sensor (e.g., like that shown in FIG. 5A) and one induced velocity sensor (e.g., like that shown in FIG. 5B) placed beneath the middle inboard rotor because less weight is placed on locations known to produce noisier and lower quality sensor data. In the context of FIG. 1, for example, the plurality of sensor datasets (e.g., received at step 100) would have less sensor data associated with (e.g., sampled from) a rotor that is surrounded (e.g., by a plurality of rotors, the fuselage, and/or other parts of the multicopter) such that the altitude generated (e.g., at step 104) would place less weight on the sensor data from the surrounded rotor and place more weight on other rotors. In some embodiments, the surrounded rotor (e.g., with the sensor data carrying less weight in the altitude estimation or generation) overlaps with at least one other rotor (e.g., which makes the airflow beneath the surrounded rotor even more messy or chaotic).

Another example sensor assignment is similar to the example shown in Table 1, except that rotor rotational speed sensors (e.g., Hall effect sensors) can be used instead of one vertical sensor (see, e.g., FIG. 5B) for induced velocity measurement per rotor. This can be achieved by calibrating the rotor rotational speed to correlate with the rotor induced velocity. In this example, Table 1 would have its right-most column replaced with a rotational speed sensor per rotor. The advantage of this example is that most rotor and/or motor speed controllers typically have such a sensor and can be repurposed to reduce the number of components, interference between probes and rotors, weight, and cost.

The following figure shows an example airflow associated with a generalized flow model.

Figure 6A:
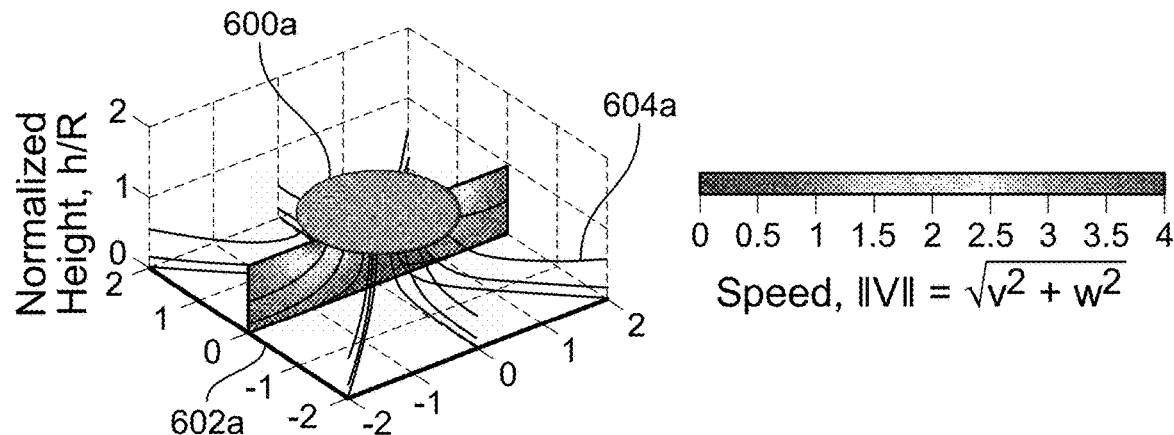
FIG. 6A is a three-dimensional graph illustrating an embodiment of a generalized flow model with the rotor at a first height.

FIG. 6A is a three-dimensional graph illustrating an embodiment of a generalized flow model with the rotor at a first height. In the example shown, the rotor (600a) is at a normalized height of h=1R where the h is the height of the rotor above the ground plane (602a) and R is the radius of the rotor. The graph also includes various flow lines (604a) showing the direction of airflow (e.g., initially down towards the ground plane before turning and running parallel to the ground plane). It is noted that the generalized flow model is associated with a single composite rotor made up of all rotors in the multicopter. There is no separate model of how two or more adjacent rotors affect each other's airflow, but rather this generalized flow model combines all rotors for the multicopter and models the airflow as one large composite rotor. The interference between each rotor is modeled internally within the generalized model as local disturbances.

Another feature of the generalized flow model is the modeling of the multicopter airframe at the centerline as a "rotor hub," which reduces the effective thrust-generating area and hence reduces the amount of thrust that can be generated.

One benefit of this generalized rotor modeling approach is that less memory and computation is required for a generalized flow model with local disturbances (i.e., inter-rotor interference) as opposed to having multiple rotor models, inter-rotor interference models, and a summarizing model to mimic the behavior of the vehicle as a function of all these other models.

Another benefit of modeling the airframe as the effective rotor hub for this generalized flow model is we use prior knowledge of significant interference factors, such as the airframe, to account for significant interference and loss of effective thrust-generating area, which does not overestimate the effect of the ground plane or amount of thrust generated. This modeling approach allows for more accurate estimation of altitude by closely modeling the actual thrust generated.

Figure 6B:
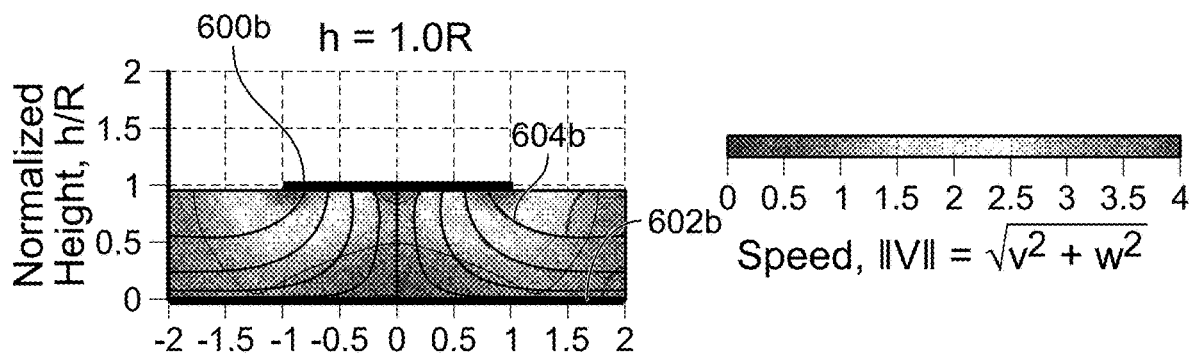
FIG. 6B is a two-dimensional graph illustrating an embodiment of a generalized flow model with the rotor at a first height.

FIG. 6B is a two-dimensional graph illustrating an embodiment of a generalized flow model with the rotor at a first height. FIG. 6B is the two-dimensional version of the three-dimensional graph shown in FIG. 6A. Note, for example, that both are at a normalized height of h=1R. Rotor 600b, ground plane 602b, and flow lines 604b correspond to rotor 600a, ground plane 602a, and flow lines 604a from FIG. 6A.

Figure 6C:
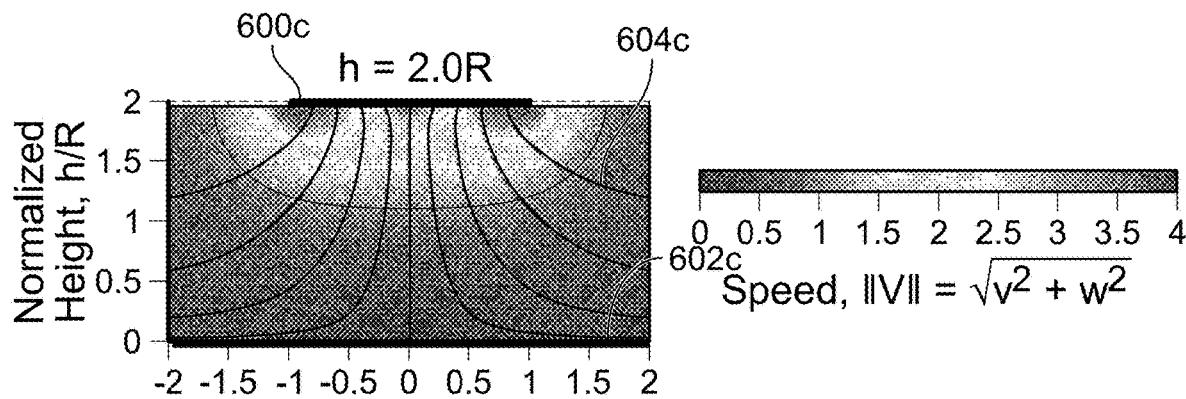
FIG. 6C is a two-dimensional graph illustrating an embodiment of a generalized flow model with the rotor at a second height.

FIG. 6C is a two-dimensional graph illustrating an embodiment of a generalized flow model with the rotor at a second height. In this example, the rotor (600c) is at a normalized height of h=2R. The resulting flow lines (604c) are shown as the airflow bends away from ground plane 602c. Contrasting FIG. 6B with FIG. 6C, we can see that the rotor airflow streamlines (indicated by the lines such as 604c) have smaller radii of curvature (i.e., bend more) when the rotor is closer to the ground at FIG. 6B, which corresponds to higher rotor flow speed close to the ground, as shown by the speed colormap. This phenomenon where rotor flow speed is higher as the rotor gets closer to the ground, and hence ground effect is stronger, is analogous to making water (rotor airflow) flow faster by pushing a hose (rotor plane) closer to the ground and corresponds well with reality The above figures show the (e.g., scalar) speed at a given point for a given height of the rotor and for a given induced velocity (e.g., the vertical velocity of the induced airflow above the rotor (not shown) as it enters or otherwise approaches the rotor; this induced velocity varies with rotor speed).

To obtain the colormap representative of the speed for each point, $\|V\|=\sqrt{\upsilon^2+\omega^2}$ where $\|V\|$ is the (scalar) speed, $\upsilon$ is the vertical velocity for a given point in space (e.g., which is measured by vertical DPP pair 504a and 506a in FIG. 5A), and $\omega$ is the radial velocity for a given point in space (e.g., which is measured by radial DPP pair 500 and 502 in FIG. 5A).

In other words, the flow model for one rotor is obtained by taking the induced velocity (or rotor rotational speed alternatively) as an input to the model and sweeping a range of rotor heights to obtain vertical velocities and radial velocities at various points or locations in space (e.g., below the rotor). The following table shows this:

TABLE 2

| Example of Flow Model for a Single Rotor | | |
|---|---|---|
| | Rotor at Height 1 | ... Rotor at Height N |
| Induced Velocity as Input (e.g., at Rotor Speed 1) | Vertical velocities ($\upsilon$) & radial velocities ($\omega$) at various points/locations in 3D space | ... Vertical velocities ($\upsilon$) & radial velocities ($\omega$) at various points/locations in 3D space |

The generalized flow model is obtained by taking the induced velocities (or rotor rotational speeds alternatively) of all ten rotors as input to the model and sweeping a range of rotor heights to obtain vertical velocities and radial velocities at various points or locations in space (e.g., below the generalized composite rotor plane).

TABLE 3

| Example of Flow Model for a Generalized Composite Rotor | | | |
|---|---|---|---|
| | Rotor at Height 1 | ... | Rotor at Height N |
| Induced Velocity 1 as Input (e.g., at Rotor 1) | Vertical velocities ($\upsilon$) & radial velocities ($\omega$) at various points/locations in 3D space | ... | Vertical velocities ($\upsilon$) & radial velocities ($\omega$) at various points/locations in 3D space |
| . | . | . | . |
| . | . | . | . |
| . | . | . | . |
| Induced Velocity M as Input (e.g., at Rotor 10) | Vertical velocities ($\upsilon$) & radial velocities ($\omega$) at various points/locations in 3D space | ... | Vertical velocities ($\upsilon$) & radial velocities ($\omega$) at various points/locations in 3D space |

In one embodiment, for compactness and/or to utilize storage more efficiently, the generalized flow model is computed and stored using (taking advantage of) the vehicle's symmetry. When we know that the aircraft is approximately level, that is, roll and pitch angles are close to zero (e.g., by feeding in attitude data from the aircraft estimator and comparing it to an attitude threshold that is close to zero), we can assume that the rotor thrust generated is approximately similar along the airframe centerline (i.e., the longitudinal axis of symmetry separating port and starboard side). Using this insight, only half the generalized flow model (separated by the airframe centerline, e.g., port side) has to be stored and computed, where the other half (e.g., starboard side) is assumed to mirror the half that was computed. Due to this insight, the estimation step only needs to incorporate half of the sensor data with half of the flow model being computed, which further improves the storage and computational efficiency. Naturally, if the vehicle should begin to tilt so that it is no longer level (e.g., the attitude exceeds the attitude threshold), it may be desirable to compute the entire generalized flow model. In some embodiments, the processor may periodically compute the entire generalized flow model (e.g., even if the attitude threshold is not exceeded) to help ensure that the generalized flow model remains accurate.

In another embodiment, the generalized flow model can be further optimized for storage and computation efficiency when the vehicle is approximately level, by computing and hence storing only a quarter of the generalized flow model, i.e., not only assuming symmetricity for half of the model separated along the airframe centerline and/or longitudinal axis of symmetry, but also along the non-symmetrical latitudinal axis (which separates the "fore" and "aft" of the airframe). Similarly, the estimation step would only need to be stored and computed using a quarter of the sensor datasets and flow model. It is of note that this optimization method should be used sparingly with the full flow model computation, e.g., toggling between quarter and full flow model computation between successive estimation iterations, or quarter, half and then full flow model computation between successive estimation iterations, to account for other disturbances and noise.

Returning briefly to step 104 in FIG. 1, in some embodiments, the consolidated probability function is continually updated by the non-linear filter (e.g., throughout the multicopter's flight). The following figures show an example of this.

Figure 7A:
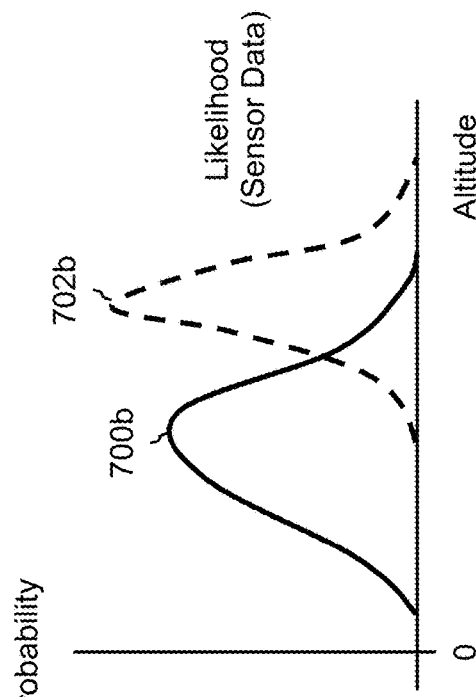
FIG. 7A is a graph illustrating an embodiment of a consolidated probability function, comprising a prior probability density function, at a first point in time.

FIG. 7A is a graph illustrating an embodiment of a consolidated probability function, comprising a prior probability density function, at a first point in time. As described above, the consolidated probability function (700a) is called a consolidated function because it consolidates information from multiple rotors, each of which may have multiple sensor datasets.

Figure 7B:
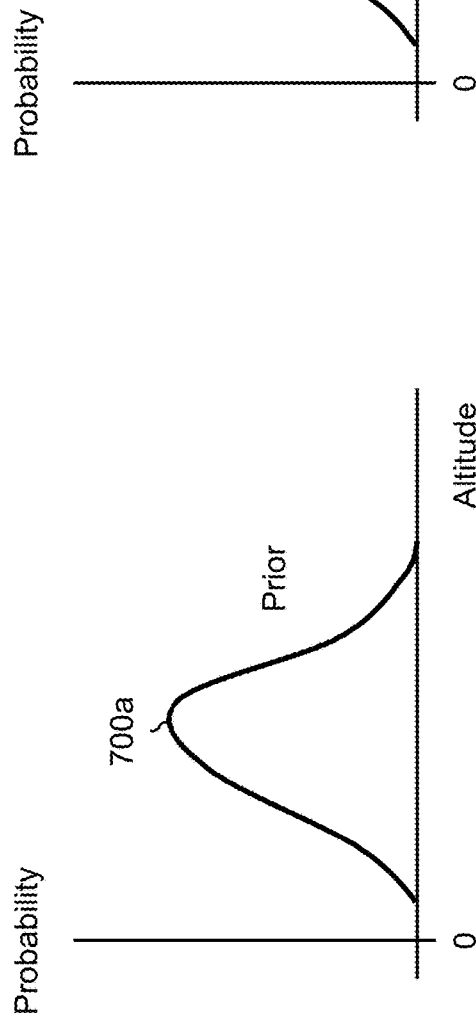
FIG. 7B is a graph illustrating an embodiment of a likelihood function which is constructed using sensor data and the generalized flow model.

FIG. 7B is a graph illustrating an embodiment of a likelihood function which is constructed using sensor data and the generalized flow model. In this example, the sensor data (e.g., associated with a current time of t or current index or iteration i) from the rotors is used to construct likelihood function 702b, for example, in combination with the generalized flow model. Conceptually, likelihood function 702b estimates a corresponding probability for each height or altitude in a range of altitudes by comparing the difference between the sensor data and the generalized flow model at different altitudes (e.g., without taking prior function (700b) into account). Since the generalized flow model can be probed at any radial and vertical locations, each sensor dataset is compared with its location-specific flow model output. The smallest difference between the data and the model yields the highest probability at that specific altitude. Since the generalized flow model models the various interference sources and aircraft geometry, it is capable of compensating for the unsteady airflow the sensor datasets measure.

Figure 7C:
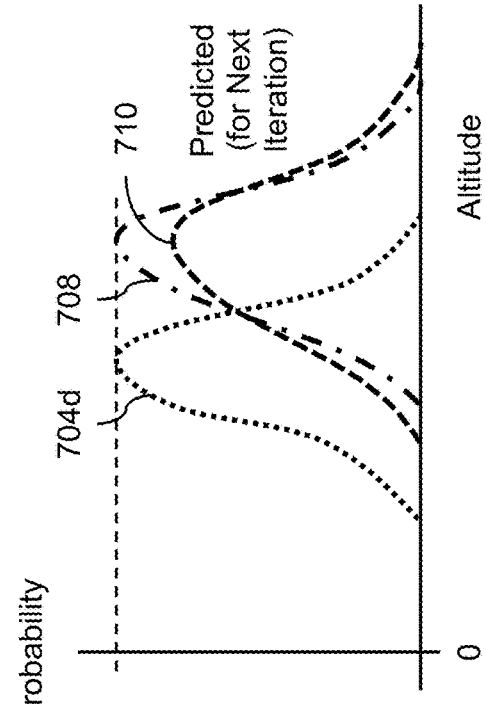
FIG. 7C is a graph illustrating an embodiment of a posterior function which is constructed from a likelihood function and a prior function.

FIG. 7C is a graph illustrating an embodiment of a posterior function which is constructed from a likelihood function and a prior function. In this example, the prior function (700c) is combined with the likelihood function (702c) using non-linear Bayesian techniques to obtain posterior function (704c). From this posterior function, the altitude or height (i.e., $h_{output}$) associated with the maxima (706) is output as the (e.g., estimated or measured) altitude or height for the multicopter (e.g., at step 104 in FIG. 1).

In some embodiments, while a multicopter is on the ground and/or at the beginning of a takeoff, instead of constructing posterior function 704c and using that to estimate altitude, an (initial) probability density function is used where the probability at a height or altitude of 0 is at or near 100% probability (e.g., because it is known when the altitude estimation process starts that the multicopter is definitely on the ground).

Figure 7D:
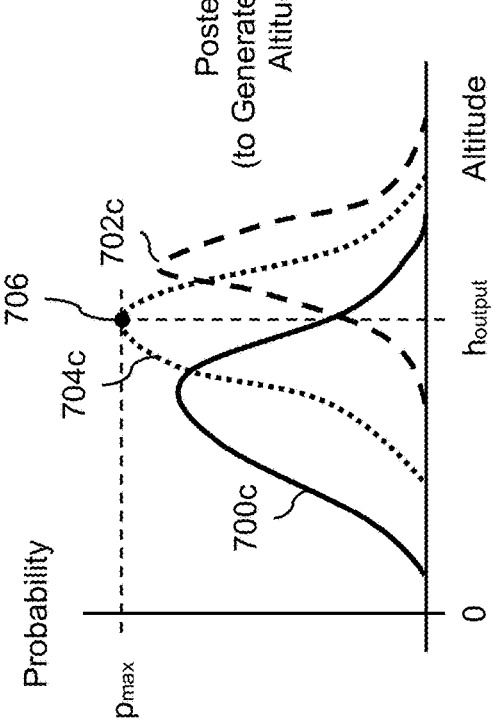
FIG. 7D is a graph illustrating an embodiment of a predicted function.

FIG. 7D is a graph illustrating an embodiment of a predicted function. At this step, posterior function 704d is updated to generate a prediction (708). For example, since this application relates to altitude estimation, any estimated and/or known information associated with ascending, descending, or staying at a same altitude (e.g., climb velocity) may be used to shift the prior function (i.e., shifting the probability mass) so that the peak moves leftward (e.g., descending), rightward (e.g., ascending), or generally the same (e.g., staying at a constant altitude). The shifted probability mass 708 is then diffused with process noise. That is, the uncertainty related to the process and/or motion model lowers the probability (i.e., lowers the confidence of the estimation output to deal with motion uncertainty) to produce the predicted function 710. Finally, the predicted function 710 is set as the prior function 700a for the next time step or iteration.

The following figure describes this example more generally and/or formally in a flowchart.

Figure 8:
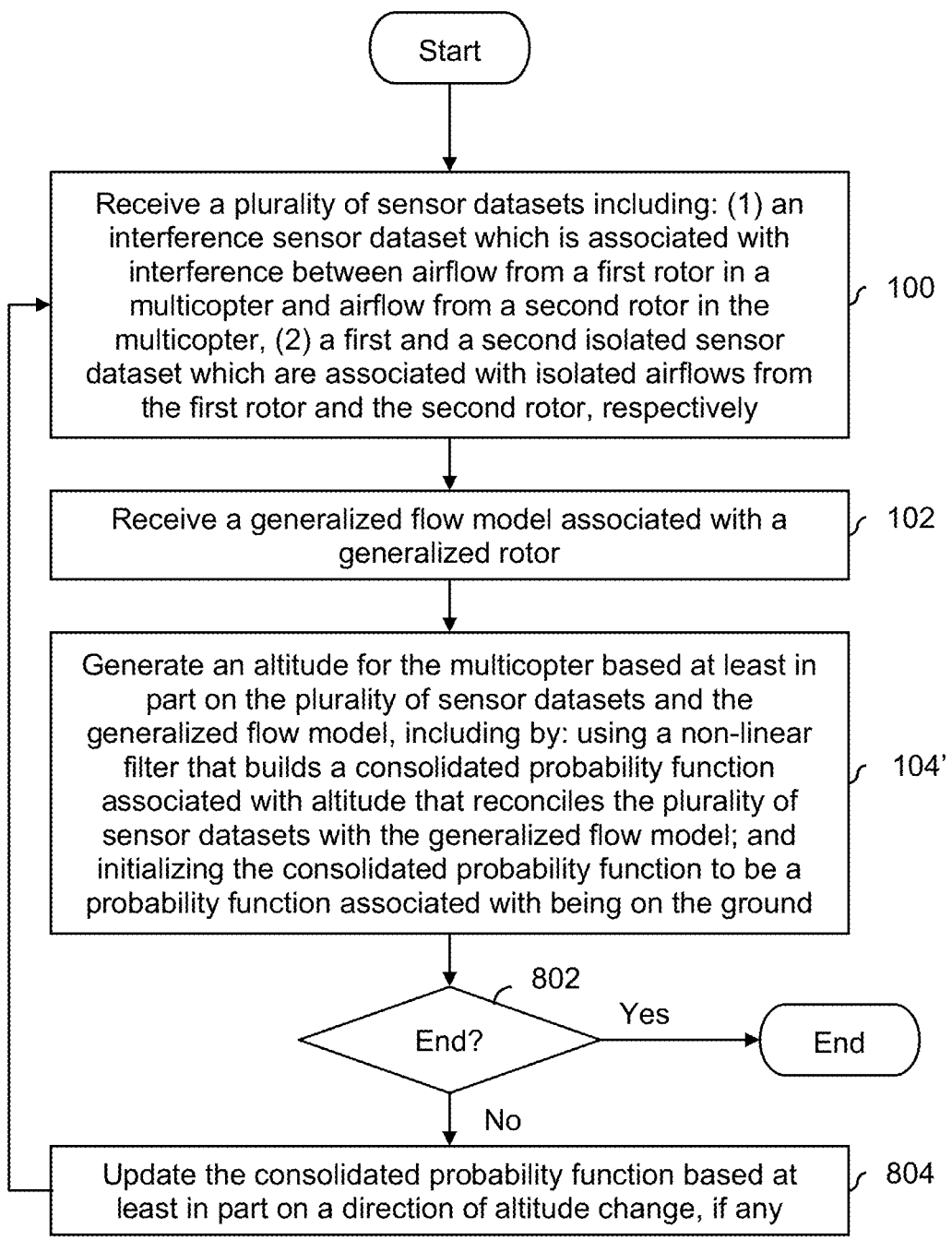
FIG. 8 is a diagram illustrating an embodiment of a process to generate an altitude for a multicopter where a consolidated probability function is updated over time.

FIG. 8 is a diagram illustrating an embodiment of a process to generate an altitude for a multicopter where a consolidated probability function is updated over time. FIG. 8 is related to FIG. 1A and for convenience related steps are indicated using the same or similar reference numbers.

At 100, a plurality of sensor datasets including: (1) an interference sensor dataset which is associated with interference between airflow from a first rotor in a multicopter and airflow from a second rotor in the multicopter, (2) a first and a second isolated sensor dataset which are associated with isolated airflow from the first rotor and the second rotor, respectively, is received.

At 102, a generalized flow model associated with a generalized rotor (e.g., a composite rotor model comprised of multi-rotors) is received.

At 104', an altitude for the multicopter is generated based at least in part on the plurality of sensor datasets and the generalized flow model, including by: using a non-linear filter that builds a consolidated probability function associated with altitude that reconciles the plurality of sensor datasets with the generalized flow model; and initializing the consolidated probability function to be a probability function associated with being on the ground. For example, the altitude estimation process (shown here) will typically begin before takeoff occurs and when the aircraft is still on the ground. As such, the probability function can be initialized to a probability (distribution) function where the probability is highly and/or completely skewed towards an altitude of zero (i.e., being on the ground). Initializing the probability function in this manner may be helpful because it starts the altitude estimation process out with an accurate probability function and helps the process start with accurate altitudes.

At 802, it is decided whether to end the process. For example, the altitude estimation may run throughout the flight and end only after the aircraft has landed.

If it is decided not to end the process, then at 804, the consolidated probability function is updated based at least in part on a direction and rate of altitude change, if any. For example, posterior function 704d in FIG. 7D is updated based on whether the aircraft ascends, descends, or stays at the same altitude and diffused to become prediction function 710. In some embodiments, this direction and rate (velocity) of altitude change, if any, is determined by tracking the altitudes that are generated. Prediction function 710 then becomes the consolidated probability function which is used at the next iteration (700a) to generate the next altitude.

The process then goes through another iteration or pass (e.g., to generate the next altitude estimate or measurement) by receiving another plurality of sensor datasets at 100 (e.g., with new sensor data).

Returning briefly to FIG. 1, in some embodiments, other measurements or estimates are generated in addition to the altitude at step 104. The following figure shows an example of this.

Figure 9:
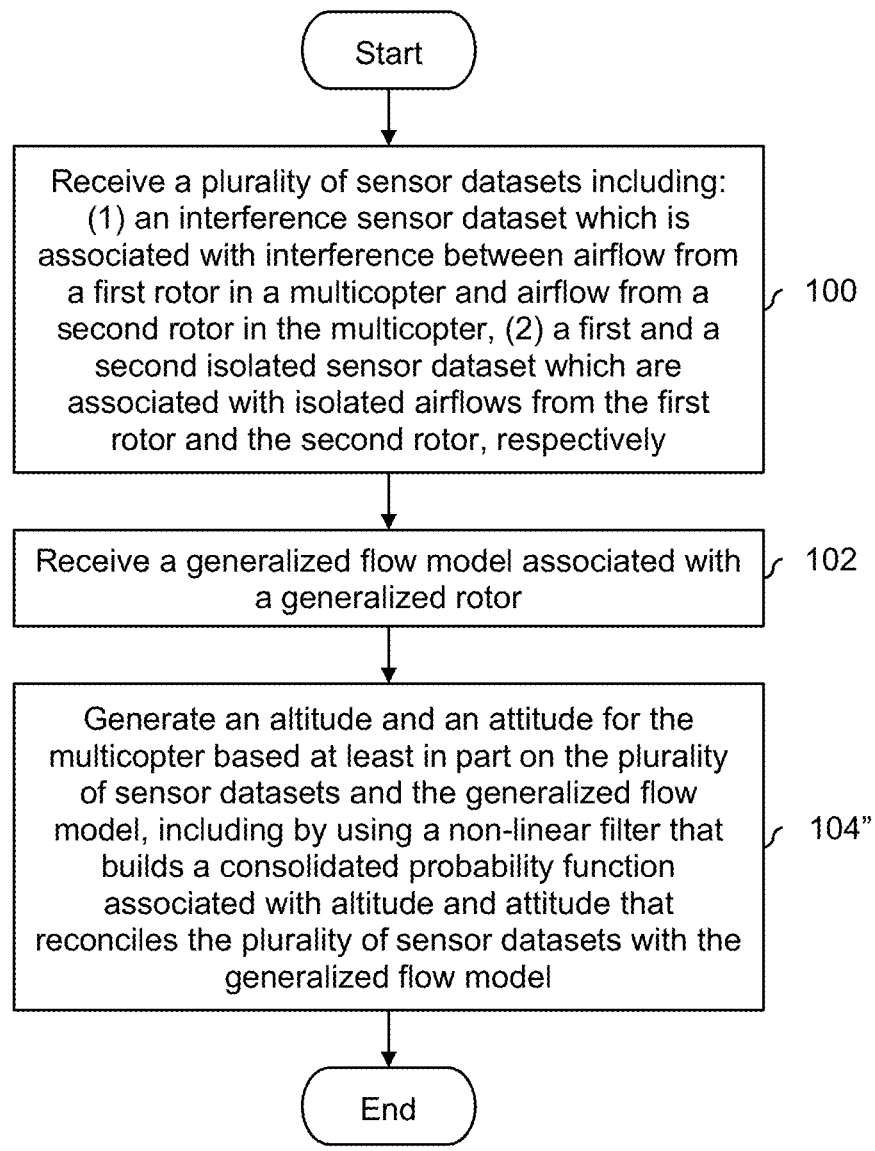
FIG. 9 is a diagram illustrating an embodiment of a process to generate an altitude and an attitude for a multicopter.

FIG. 9 is a diagram illustrating an embodiment of a process to generate an altitude and an attitude for a multicopter. FIG. 9 is related to FIG. 1A and for convenience related steps are indicated using the same or similar reference numbers. This technique may be combined with any of the other techniques described herein; specific combinations of various techniques are not necessarily described for brevity.

At 100, a plurality of sensor datasets including: (1) an interference sensor dataset which is associated with interference between airflow from a first rotor in a multicopter and airflow from a second rotor in the multicopter, (2) a first and a second isolated sensor dataset which are associated with isolated airflow from the first rotor and the second rotor, respectively, is received.

At 102, a generalized flow model associated with a generalized rotor is received. Since the generalized flow model is a composite rotor model comprised of multiple rotors, inherently the model is capable of simulating rotor airflow generated by a vehicle flying at non-level attitudes by adding a few parameters. To be used for attitude estimation, the generalized flow model needs to incorporate both roll and pitch angles as parameters such that the airflow can be generated for non-zero attitudes. In one example, if the vehicle is pitched forward (fore section tilting downward), the airflow speed generated is faster in the fore section as opposed to the aft section, which is captured by the generalized flow model.

At 104", an altitude and an attitude for the multicopter are generated based at least in part on the plurality of sensor datasets and the generalized flow model, including by using a non-linear filter that builds a consolidated probability function associated with altitude and altitude that reconciles the plurality of sensor datasets with the generalized flow model. The following figure shows an example of two rotors with a non-zero attitude and may be helpful to illustrate how step 104" is performed.

Figure 10:
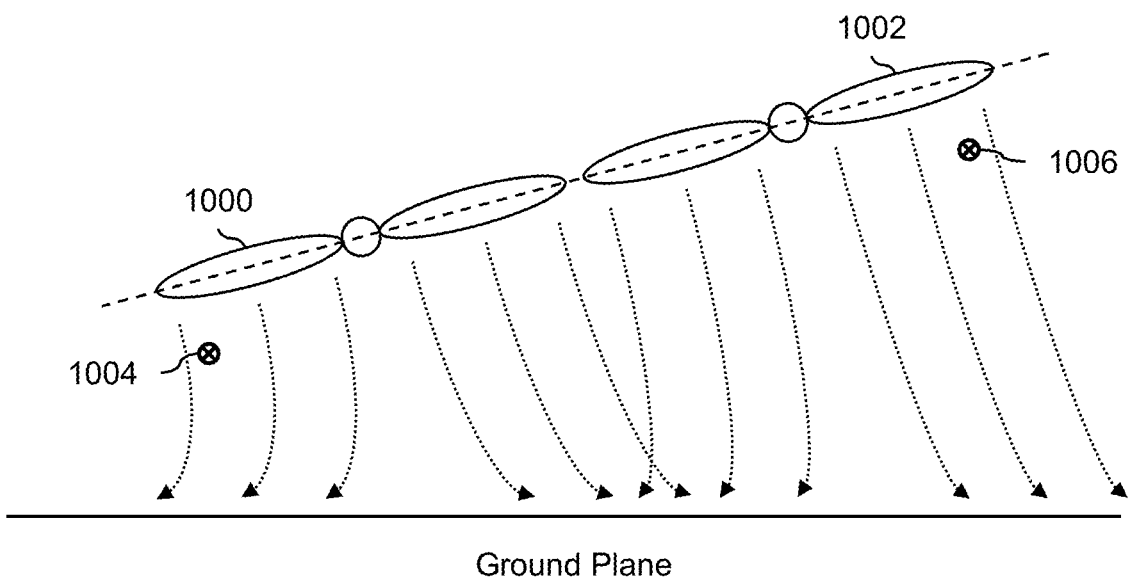
FIG. 10 is a diagram illustrating an embodiment of ground effect airflow when there is a non-zero attitude.

FIG. 10 is a diagram illustrating an embodiment of ground effect airflow when there is a non-zero attitude. For simplicity and ease of explanation, two rotors (1000 and 1002) are used to represent an entire multicopter with multiple rotors (e.g., the multicopter shown in FIGS. 2 and 3). Also for simplicity and ease of explanation, the interference between the two airflows generated by the two rotors is not shown in the diagram.

When a multicopter is not level (as is shown here), the attitude (e.g., comprising a roll and pitch value) will be non-zero. The attitude can be estimated by the different measurements of the sensor datasets. For example, sensor 1004 (which is located beneath the rotor (1000) that is closer to the ground plane) will tend to observe higher airflow velocities (due to the airflow bouncing off the closer ground plane) compared to sensor 1006 (which is located beneath the rotor (1002) that is located further from the ground plane). This difference in rotor airflow velocities can be translated or otherwise used to generate (e.g., estimate of) the multicopter's attitude. Note that although only two sensors (1004 and 1006) are shown for simplicity, the actual number of sensors is similar to those shown in Table 1.

More specifically, the sensor datasets are first collected. Note that the numbers of sensors and sensor locations are the same for the estimation of altitude and attitude. The generalized flow model with attitude parameters to tilt the airflow is then updated within the estimation step. Similar to altitude estimation, the non-linear estimator compares the difference between the sensor speeds and the flow model speeds in order to update the consolidated probability function, where the smallest difference between sensor and model values yields the highest probability.

The estimation framework is tightly coupled between the altitude and attitude estimation for the exemplary vehicle described herein, which means that altitude and attitude are not separately and/or individually estimated. This tightly coupled estimation framework choice is so chosen since the Flyer attitude and altitude are closely related. For example, as the Flyer pitches forward and/or nose-down, it loses altitude simultaneously since the same rotors that provide pitch control also provide altitude control. A counter-example to this would be a thrust-vectoring capable vehicle where altitude and attitude controls are separate.

Specifically, the consolidated probability function for estimating both altitude, and roll angle and pitch angle (known together as attitude) is expanded to be a four-dimensional probability function, three dimensions for each estimated parameter and one dimension for the probability. The consolidated probability function is updated sequentially along each dimension, i.e., in a tightly-coupled fashion, and upon completion of this step, all three estimates for altitude, roll angle, and pitch angle are produced.

Similar to the case of altitude estimation using half or a quarter of the flow-model when the vehicle is approximately level, altitude and attitude estimation can also be further optimized to use only half or a quarter of the flow model since the assumption of symmetricity of rotor airflow along both longitudinal and latitudinal vehicle axes holds true for level attitude. This assumption of symmetricity is motivated by the geometry of the exemplary 10-rotor multicopter vehicle (described above) which has exactly the same number of rotors on its left-right and fore-aft sides, which is suitably modeled by the generalized composite flow model comprised of multiple rotors. Using these optimizations, only half or a quarter of the flow model and estimation step comparing sensor datasets and flow models have to be computed and stored.

The fact that this attitude estimation framework can help determine the use of the half or quarter-model optimization (i.e., only during approximately level attitudes) makes this altitude and attitude estimation framework a self-containing/standalone system which does not require other sensing modalities and estimation frameworks.

The half or quarter-flow models should be sparingly used with the full flow model computations especially for altitude and attitude estimation, e.g., using a half or quarter-flow model and then using a full flow model between successive estimation iterations to ensure that disturbances and noise do not creep into the estimation too quickly.

While the half and quarter-flow models and estimation optimizations can be used for approximately level attitude, in the case of large attitude angles, the full flow model and estimation framework have to be used. In one example where the exemplary vehicle described above is limited to operate up to certain attitudes, further optimizations are done to strike a balance between accurate estimation and decreased computation and storage requirements. In one example, between 0-5 degrees of roll or pitch, a quarter-flow model and estimation optimization is used then followed by a half-model optimization and then a full-model computation between successive estimation iterations; between 5-8 degrees of roll or pitch, a half-model optimization is used and then a full-model computation between successive estimation iterations; larger than 8 degrees of roll or pitch, only full-model computations are allowed.

Another consideration specific to the exemplary vehicle described above is that at altitudes less than 0.75 effective rotor radius (i.e., three-quarters of half of the maximum tip-to-tip distance between the outboard rotors), i.e., during takeoff and landing which tend to have rapidly-changing non-level attitude and significant airflow turbulence due to the pontoon and booms being in the rotor wake, the half and quarter-flow model optimizations are not used. Between altitudes of 0.75-1.25 effective rotor radius, the half-model optimization is used and then the full model computation between successive estimation iterations. At 1.25-2.0 effective rotor radius, the quarter-model optimization is used, followed by the half-model optimization and then the full model computation between successive estimation iterations.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor; and
a memory coupled with the processor, wherein the memory is configured to provide the processor with instructions which when executed cause the processor to:
receive an interference sensor dataset associated with interference between airflows from at least two rotors in a multicopter and a first isolated sensor dataset and a second isolated sensor dataset which are associated with isolated airflows from a first rotor and a second rotor in the multicopter, respectively;
receive a generalized flow model associated with a generalized rotor; and
generate an altitude for the multicopter based at least in part on the interference sensor dataset, the first isolated sensor dataset, the second isolated sensor dataset, and the generalized flow model, including by using a non-linear filter that builds a consolidated probability function associated with altitude that reconciles the interference sensor dataset, the first isolated sensor dataset, and the second isolated sensor dataset with the generalized flow model, wherein the interference sensor dataset is obtained from a sensor that is placed beneath at least two overlapping rotors in the multicopter.

2. The system recited in claim 1, wherein at least one of the interference sensor dataset, the first isolated sensor dataset, or the second isolated sensor dataset is obtained using differential pressure probes.

3. The system recited in claim 1, wherein the memory is further configured to provide the processor with instructions which when executed cause the processor to generate an attitude for the multicopter.

4. A system, comprising:
a processor; and
a memory coupled with the processor, wherein the memory is configured to provide the processor with instructions which when executed cause the processor to:
receive an interference sensor dataset associated with interference between airflows from at least two rotors in a multicopter and a first isolated sensor dataset and a second isolated sensor dataset which are associated with isolated airflows from a first rotor and a second rotor in the multicopter, respectively;
receive a generalized flow model associated with a generalized rotor; and
generate an altitude for the multicopter based at least in part on the interference sensor dataset, the first isolated sensor dataset, the second isolated sensor dataset, and the generalized flow model, including by using a non-linear filter that builds a consolidated probability function associated with altitude that reconciles the interference sensor dataset, the first isolated sensor dataset, and the second isolated sensor dataset with the generalized flow model, wherein the interference sensor dataset is used to separate multi-rotor interference from ground effect.

5. The system recited in claim 4, wherein at least one of the interference sensor dataset, the first isolated sensor dataset, or the second isolated sensor dataset is obtained using differential pressure probes.

6. The system recited in claim 4, wherein the memory is further configured to provide the processor with instructions which when executed cause the processor to generate an attitude for the multicopter.

7. The system recited in claim 2, A system, comprising:
a processor; and
a memory coupled with the processor, wherein the memory is configured to provide the processor with instructions which when executed cause the processor to:
receive an interference sensor dataset associated with interference between airflows from at least two rotors in a multicopter and a first isolated sensor dataset and a second isolated sensor dataset which are associated with isolated airflows from a first rotor and a second rotor in the multicopter, respectively;
receive a generalized flow model associated with a generalized rotor; and
generate an altitude for the multicopter based at least in part on the interference sensor dataset, the first isolated sensor dataset, the second isolated sensor dataset, and the generalized flow model, including by using a non-linear filter that builds a consolidated probability function associated with altitude that reconciles the interference sensor dataset, the first isolated sensor dataset, and the second isolated sensor dataset with the generalized flow model, wherein:
the multicopter includes an ultralight, open-cockpit vehicle with at least one float; and
at least one rotor is coupled to a top surface of said at least one float.

8. The system recited in claim 7, wherein at least one of the interference sensor dataset, the first isolated sensor dataset, or the second isolated sensor dataset is obtained using differential pressure probes.

9. The system recited in claim 7, wherein the memory is further configured to provide the processor with instructions which when executed cause the processor to generate an attitude for the multicopter.

10. A system, comprising:
a processor; and
a memory coupled with the processor, wherein the memory is configured to provide the processor with instructions which when executed cause the processor to:
receive an interference sensor dataset associated with interference between airflows from at least two rotors in a multicopter and a first isolated sensor dataset and a second isolated sensor dataset which are associated with isolated airflows from a first rotor and a second rotor in the multicopter, respectively;
receive a generalized flow model associated with a generalized rotor; and
generate an altitude for the multicopter based at least in part on the interference sensor dataset, the first isolated sensor dataset, the second isolated sensor dataset, and the generalized flow model, including by using a non-linear filter that builds a consolidated probability function associated with altitude that reconciles the interference sensor dataset, the first isolated sensor dataset, and the second isolated sensor dataset with the generalized flow model, wherein:
the multicopter includes an middle inboard rotor that is surrounded by a fuselage and a plurality of other rotors; and more isolated sensor datasets are collected per rotor from the plurality of other rotors than from the middle inboard rotor.

11. The system recited in claim 10, wherein at least one of the interference sensor dataset, the first isolated sensor dataset, or the second isolated sensor dataset is obtained using differential pressure probes.

12. The system recited in claim 10, wherein the memory is further configured to provide the processor with instructions which when executed cause the processor to generate an attitude for the multicopter.

13. A system, comprising:
a processor; and
a memory coupled with the processor, wherein the memory is configured to provide the processor with instructions which when executed cause the processor to:
receive an interference sensor dataset associated with interference between airflows from at least two rotors in a multicopter and a first isolated sensor dataset and a second isolated sensor dataset which are associated with isolated airflows from a first rotor and a second rotor in the multicopter, respectively;
receive a generalized flow model associated with a generalized rotor; and
generate an altitude for the multicopter based at least in part on the interference sensor dataset, the first isolated sensor dataset, the second isolated sensor dataset, and the generalized flow model, including by using a non-linear filter that builds a consolidated probability function associated with altitude that reconciles the interference sensor dataset, the first isolated sensor dataset, and the second isolated sensor dataset with the generalized flow model, wherein:
generating the altitude for the multicopter further includes generating an attitude for the multicopter; and
the altitude and the attitude are generated simultaneously, including by using a four-dimensional consolidated probability function associated with altitude, roll angle, and pitch angle.

14. The system recited in claim 13, wherein at least one of the interference sensor dataset, the first isolated sensor dataset, or the second isolated sensor dataset is obtained using differential pressure probes.

15. A method, comprising:
receiving an interference sensor dataset associated with interference between airflows from at least two rotors in a multicopter and a first isolated sensor dataset and a second isolated sensor dataset which are associated with isolated airflows from a first rotor and a second rotor in the multicopter, respectively;
receiving a generalized flow model associated with a generalized rotor; and
generating an altitude for the multicopter based at least in part on the interference sensor dataset, the first isolated sensor dataset, the second isolated sensor dataset, and the generalized flow model, including by using a non-linear filter that builds a consolidated probability function associated with altitude that reconciles the interference sensor dataset, the first isolated sensor dataset, and the second isolated sensor dataset with the generalized flow model, wherein the interference sensor dataset is obtained from a sensor that is placed beneath at least two overlapping rotors in the multicopter.

16. The method recited in claim 15, wherein at least one of the interference sensor dataset, the first isolated sensor dataset, or the second isolated sensor dataset is obtained using differential pressure probes.

17. The method recited in claim 15, further including generating the altitude for the multicopter further includes generating an attitude for the multicopter.

18. A method, comprising:
receiving an interference sensor dataset associated with interference between airflows from at least two rotors in a multicopter and a first isolated sensor dataset and a second isolated sensor dataset which are associated with isolated airflows from a first rotor and a second rotor in the multicopter, respectively;
receiving a generalized flow model associated with a generalized rotor; and
generating an altitude for the multicopter based at least in part on the interference sensor dataset, the first isolated sensor dataset, the second isolated sensor dataset, and the generalized flow model, including by using a non-linear filter that builds a consolidated probability function associated with altitude that reconciles the interference sensor dataset, the first isolated sensor dataset, and the second isolated sensor dataset with the generalized flow model, wherein the interference sensor dataset is used to separate multi-rotor interference from ground effect.

19. A method, comprising:
receiving an interference sensor dataset associated with interference between airflows from at least two rotors in a multicopter and a first isolated sensor dataset and a second isolated sensor dataset which are associated with isolated airflows from a first rotor and a second rotor in the multicopter, respectively;
receiving a generalized flow model associated with a generalized rotor; and
generating an altitude for the multicopter based at least in part on the interference sensor dataset, the first isolated sensor dataset, the second isolated sensor dataset, and the generalized flow model, including by using a non-linear filter that builds a consolidated probability function associated with altitude that reconciles the interference sensor dataset, the first isolated sensor dataset, and the second isolated sensor dataset with the generalized flow model, wherein:
the multicopter includes an ultralight, open-cockpit vehicle with at least one float; and
at least one rotor is coupled to a top surface of said at least one float.

20. A method, comprising:
receiving an interference sensor dataset associated with interference between airflows from at least two rotors in a multicopter and a first isolated sensor dataset and a second isolated sensor dataset which are associated with isolated airflows from a first rotor and a second rotor in the multicopter, respectively;
receiving a generalized flow model associated with a generalized rotor; and
generating an altitude for the multicopter based at least in part on the interference sensor dataset, the first isolated sensor dataset, the second isolated sensor dataset, and the generalized flow model, including by using a non-linear filter that builds a consolidated probability function associated with altitude that reconciles the interference sensor dataset, the first isolated sensor dataset, and the second isolated sensor dataset with the generalized flow model, wherein:

the multicopter includes an middle inboard rotor that is surrounded by a fuselage and a plurality of other rotors; and more isolated sensor datasets are collected per rotor from the plurality of other rotors than from the middle inboard rotor.

21. A method, comprising:

receiving an interference sensor dataset associated with interference between airflows from at least two rotors in a multicopter and a first isolated sensor dataset and a second isolated sensor dataset which are associated with isolated airflows from a first rotor and a second rotor in the multicopter, respectively;

receiving a generalized flow model associated with a generalized rotor; and generating an altitude for the multicopter based at least in part on the interference sensor dataset, the first isolated sensor dataset, the second isolated sensor dataset, and the generalized flow model, including by using a non-linear filter that builds a consolidated probability function associated with altitude that reconciles the interference sensor dataset, the first isolated sensor dataset, and the second isolated sensor dataset with the generalized flow model, wherein:

generating the altitude for the multicopter further includes generating an attitude for the multicopter; and the altitude and the attitude are generated simultaneously, including by using a four-dimensional consolidated probability function associated with altitude, roll angle, and pitch angle.

* * * * *

UNITED STATES PATENT AND TRADEMARK OFFICE
CERTIFICATE OF CORRECTION

PATENT NO. : 11,279,475 B2
APPLICATION NO. : 16/698657
DATED : March 22, 2022
INVENTOR(S) : Chin Gian Hooi Page 1 of 1

It is certified that error appears in the above-identified patent and that said Letters Patent is hereby corrected as shown below:

In the Claims

In Column 20, Line 5, Claim 7, delete "The system recited in claim 2,".

Signed and Sealed this
Eighteenth Day of October, 2022

Katherine Kelly Vidal
*Director of the United States Patent and Trademark Office*